US008645575B1

(12) United States Patent
McKnight et al.

(10) Patent No.: US 8,645,575 B1
(45) Date of Patent: Feb. 4, 2014

(54) APPARATUS, METHOD, AND COMPUTER PROGRAM FOR PERFORMING TEXT-TO-SPEECH CONVERSION OF INSTANT MESSAGES DURING A CONFERENCE CALL

(75) Inventors: David W. McKnight, Garland, TX (US); F. Randall Murray, II, McKinney, TX (US); Stephen R. Whynot, McKinney, TX (US)

(73) Assignee: Apple Inc., Cupertino, CA (US)

( * ) Notice: Subject to any disclaimer, the term of this patent is extended or adjusted under 35 U.S.C. 154(b) by 2445 days.

(21) Appl. No.: 10/814,080

(22) Filed: Mar. 31, 2004

(51) Int. Cl.
*G06F 15/16* (2006.01)

(52) U.S. Cl.
USPC ... 709/249; 709/206; 379/202.01; 379/88.25; 379/88.17; 455/416; 370/260

(58) Field of Classification Search
USPC ............ 709/204; 348/14.07–8; 379/202, 335; 704/227
See application file for complete search history.

(56) References Cited

U.S. PATENT DOCUMENTS

| | | | |
|---|---|---|---|
| 5,619,555 A | 4/1997 | Fenton et al. | |
| 5,710,591 A | 1/1998 | Bruno et al. | |
| 5,812,653 A | 9/1998 | Jodoin et al. | |
| 5,889,945 A | 3/1999 | Porter et al. | |
| 6,073,166 A | 6/2000 | Forsen | |
| 6,125,115 A | 9/2000 | Smits | |
| 6,185,565 B1 | 2/2001 | Meubus et al. | |
| 6,201,859 B1 | 3/2001 | Memhard et al. | |
| 6,418,214 B1 * | 7/2002 | Smythe et al. ........... 379/202.01 |
| 6,501,834 B1 | 12/2002 | Milewski et al. | |
| 6,594,693 B1 | 7/2003 | Borwankar | |
| 6,618,746 B2 | 9/2003 | Desai et al. | |
| 6,628,767 B1 | 9/2003 | Wellner et al. | |
| 6,671,717 B1 | 12/2003 | Shaffer et al. | |
| 6,674,459 B2 | 1/2004 | Ben-Shachar et al. | |
| 6,687,358 B1 * | 2/2004 | Mark et al. ............... 379/202.01 |
| 6,724,872 B1 * | 4/2004 | Moore et al. ............... 379/93.35 |
| 6,747,970 B1 | 6/2004 | Lamb et al. | |
| 6,763,226 B1 * | 7/2004 | McZeal, Jr. ................. 455/90.2 |
| 6,782,413 B1 * | 8/2004 | Loveland ..................... 709/204 |

(Continued)

FOREIGN PATENT DOCUMENTS

| | | |
|---|---|---|
| GB | 2 352 845 A | 2/2001 |
| WO | WO 03/021900 A1 | 3/2003 |

(Continued)

OTHER PUBLICATIONS

Kumar, Korpi, Sengodon: "IP Telephony with H.323, Architectures for Unified Networks and Integrated Services", Apr. 1, 2001, John Wiley & Sons, Inc., US, XP002302183, pp. 134-142 and pp. 290-298.

(Continued)

*Primary Examiner* — Greg C Bengzon
(74) *Attorney, Agent, or Firm* — Meyertons, Hood, Kivlin, Kowert & Goetzel, P.C.

(57) ABSTRACT

An instant message associated with a conference call is received. At least some of the contents of the instant message are converted into speech, which may be represented as an audio stream. The speech is then provided to at least one participant associated with the conference call. The speech provided to the at least one participant may further include additional speech in addition to the speech corresponding to the contents of the instant message. The additional speech could, among other things, identify a participant who sent the instant message.

20 Claims, 2 Drawing Sheets

(56) References Cited

U.S. PATENT DOCUMENTS

| | | | |
|---|---|---|---|
| 6,810,116 B1 | 10/2004 | Sorensen et al. | |
| 6,816,578 B1* | 11/2004 | Kredo et al. | 379/88.17 |
| 6,854,114 B1 | 2/2005 | Sexton et al. | |
| 6,870,916 B2 | 3/2005 | Henrikson et al. | |
| 6,898,569 B1* | 5/2005 | Bansal et al. | 705/7.16 |
| 6,920,475 B1 | 7/2005 | Klots et al. | |
| 6,931,113 B2 | 8/2005 | Ortel | |
| 6,976,055 B1 | 12/2005 | Shaffer et al. | |
| 6,987,736 B1 | 1/2006 | Horton | |
| 7,003,086 B1 | 2/2006 | Shaffer et al. | |
| 7,042,879 B2 | 5/2006 | Eschbach et al. | |
| 7,058,036 B1* | 6/2006 | Yu et al. | 370/335 |
| 7,113,987 B2 | 9/2006 | Nabkel et al. | |
| 7,136,462 B2 | 11/2006 | Pelaez et al. | |
| 7,154,864 B2 | 12/2006 | Costa-Requena et al. | |
| 7,154,999 B2 | 12/2006 | Florkey et al. | |
| 7,177,302 B2 | 2/2007 | Stademann | |
| 7,277,697 B2* | 10/2007 | Desai et al. | 455/416 |
| 7,289,609 B2* | 10/2007 | Ganani et al. | 379/88.25 |
| 7,742,587 B2* | 6/2010 | Cohen | 379/202.01 |
| 7,903,796 B1* | 3/2011 | Kheradpir et al. | 379/88.17 |
| 8,149,995 B2* | 4/2012 | Kirchmeier et al. | 379/37 |
| 2001/0005372 A1 | 6/2001 | Cave et al. | |
| 2002/0069069 A1* | 6/2002 | Kanevsky et al. | 704/271 |
| 2002/0071539 A1* | 6/2002 | Diament et al. | 379/202.01 |
| 2002/0071540 A1 | 6/2002 | Dworkin | |
| 2002/0078150 A1 | 6/2002 | Thompson et al. | |
| 2002/0118809 A1 | 8/2002 | Eisenberg | |
| 2002/0122391 A1* | 9/2002 | Shalit | 370/260 |
| 2002/0124100 A1 | 9/2002 | Adams | |
| 2002/0131561 A1 | 9/2002 | Gifford et al. | |
| 2002/0161578 A1 | 10/2002 | Saindon et al. | |
| 2002/0188777 A1 | 12/2002 | Kraft et al. | |
| 2003/0039340 A1 | 2/2003 | Deshpande et al. | |
| 2003/0145054 A1 | 7/2003 | Dyke | |
| 2003/0187658 A1 | 10/2003 | Selin et al. | |
| 2003/0233416 A1 | 12/2003 | Beyda | |
| 2003/0233417 A1* | 12/2003 | Beyda et al. | 709/206 |
| 2004/0001574 A1 | 1/2004 | Seligmann | |
| 2004/0003041 A1* | 1/2004 | Moore et al. | 709/204 |
| 2004/0028199 A1 | 2/2004 | Carlson | |
| 2004/0086100 A1 | 5/2004 | Moore et al. | |
| 2004/0199649 A1 | 10/2004 | Tarnanen et al. | |
| 2004/0203677 A1 | 10/2004 | Brown et al. | |
| 2004/0235509 A1 | 11/2004 | Burritt et al. | |
| 2005/0018826 A1* | 1/2005 | Benco et al. | 379/202.01 |
| 2005/0021344 A1* | 1/2005 | Davis et al. | 704/277 |
| 2005/0034079 A1 | 2/2005 | Gunasekar et al. | |
| 2005/0063524 A1 | 3/2005 | McKibben et al. | |
| 2005/0069116 A1* | 3/2005 | Murray | 379/202.01 |
| 2005/0074101 A1* | 4/2005 | Moore et al. | 379/114.01 |
| 2005/0198096 A1* | 9/2005 | Shaffer et al. | 709/200 |
| 2005/0206721 A1* | 9/2005 | Bushmitch et al. | 348/14.09 |
| 2005/0212908 A1* | 9/2005 | Rodman et al. | 348/14.08 |
| 2005/0213724 A1* | 9/2005 | O'Brien et al. | 379/202.01 |
| 2007/0230668 A1* | 10/2007 | Brown et al. | 379/88.14 |
| 2009/0135008 A1* | 5/2009 | Kirchmeier et al. | 340/540 |
| 2012/0117153 A1* | 5/2012 | Gunasekar et al. | 709/204 |
| 2013/0035055 A1* | 2/2013 | Kirchmeier et al. | 455/404.1 |

FOREIGN PATENT DOCUMENTS

| | | |
|---|---|---|
| WO | WO 03-049459 A1 | 6/2003 |
| WO | WO 03/051027 A1 | 6/2003 |
| WO | WO 03/061227 A2 | 7/2003 |

OTHER PUBLICATIONS

Office Action dated Jan. 3, 2008 in connection with U.S. Appl. No. 10/675,121, filed Sep. 30, 2003.

Office Action dated May 2, 2007 in connection with U.S. Appl. No. 10/675,121, filed Sep. 30, 2003.

Office Action dated Jul. 25, 2007 in connection with U.S. Appl. No. 10/814,383, filed Mar. 31, 2004.

Office Action dated Dec. 1, 2006 in connection with U.S. Appl. No. 10/814,383, filed Mar. 31, 2004.

Office Action dated May 5, 2006 in connection with U.S. Appl. No. 10/814,383, filed Mar. 31, 2004.

Office Action dated Sep. 21, 2005 in connection with U.S. Appl. No. 10/814,383, filed Mar. 31, 2004.

Office Action dated Dec. 6, 2007 in connection with U.S. Appl. No. 10/610,517, filed Jun. 30, 2003.

Office Action dated Jun. 19, 2007 in connection with U.S. Appl. No. 10/610,517, filed Jun. 30, 2003.

Office Action dated Apr. 6, 2007 in connection with U.S. Appl. No. 10/610,511, filed Jun. 30, 2003.

Office Action dated Oct. 12, 2007 in connection with U.S. Appl. No. 10/610,511, filed Jun. 30, 2003.

Office Action dated Feb. 22, 2008 in connection with U.S. Appl. No. 10/610,511, filed Jun. 30, 2003.

Office Action dated Sep. 17, 2008 issued in connection with United States Patent Application U.S. Appl. No. 10/610,511.

Office Action dated Dec. 9, 2009 in connection with U.S. Appl. No. 10/610,511.

Office Action dated Sep. 16, 2008 issued in connection with U.S. Appl. No. 10/675,121.

Office Action as issued by the United States Patent and Trademark Office on Apr. 27, 2009 in connection with U.S. Appl. No. 10/610,511, filed Jun. 30, 2003.

* cited by examiner

APPARATUS, METHOD, AND COMPUTER PROGRAM FOR PERFORMING TEXT-TO-SPEECH CONVERSION OF INSTANT MESSAGES DURING A CONFERENCE CALL

CROSS REFERENCE TO RELATED APPLICATIONS

This application is related to:

U.S. patent application Ser. No. 10/610,511 entitled "DISTRIBUTED CALL SERVER SUPPORTING COMMUNICATION SESSIONS IN A COMMUNICATION SYSTEM AND METHOD," filed on Jun. 30, 2003;

U.S. patent application Ser. No. 10/610,517 entitled "METHOD AND SYSTEM FOR PROVIDING TEXT-TO-SPEECH INSTANT MESSAGING," filed on Jun. 30, 2003; and U.S. patent application Ser. No. 10/675,121 entitled "APPARATUS, METHOD, AND COMPUTER PROGRAM FOR PROVIDING INSTANT MESSAGES RELATED TO A CONFERENCE CALL," filed on Sep. 30, 2003;

each of which is incorporated herein by reference.

TECHNICAL FIELD

This disclosure relates generally to call conferencing systems and more specifically to an apparatus, method, and computer program for performing text-to-speech conversion of instant messages during a conference call.

BACKGROUND

Audio and video conferencing systems are becoming more popular in the United States and around the world. In a conventional conferencing system, one participant communicates audio signals to other participants (often through a multipoint conferencing server or other unit) and receives audio signals from the other participants (indirectly through the server). The participants may also exchange video images allowing the participants to see one another.

SUMMARY

This disclosure provides an apparatus, method, and computer program for performing text-to-speech conversion of instant messages during a conference call.

In one aspect, an instant message associated with a conference call is received. At least some of the contents in the instant message are converted into speech, which may be represented as an audio stream. The speech is then provided to at least one participant associated with the conference call.

In a particular aspect, the speech generated and provided to the at least one participant includes speech generated using the contents of the instant message and additional speech. The additional speech may, for example, identify a person who sent the instant message.

In another particular aspect, the contents of the instant message are forwarded to at least one participant associated with the conference call.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
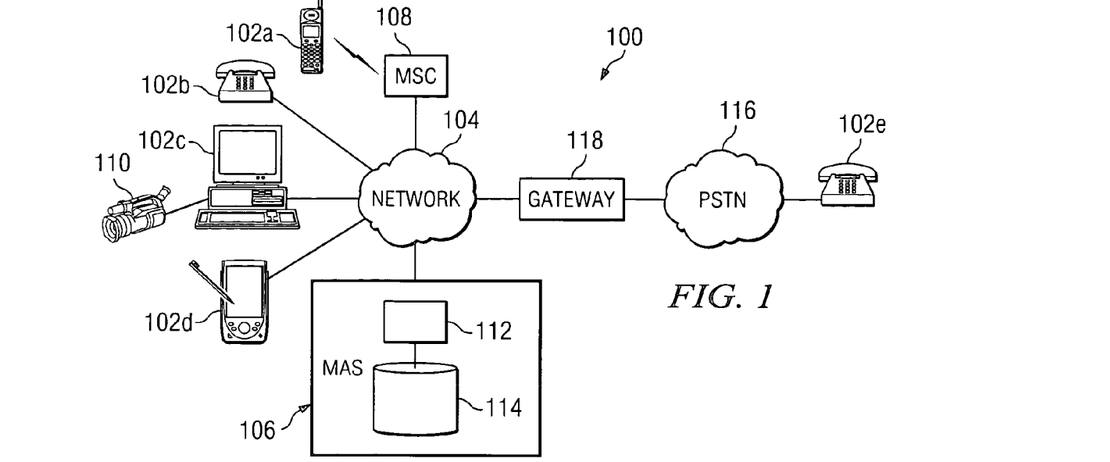
FIG. 1 illustrates an example communication system according to one embodiment of this disclosure.

FIG. 1 illustrates an example communication system 100 according to one embodiment of this disclosure. The system 100 shown in FIG. 1 is for illustration only. Other embodiments of the system 100 may be used without departing from the scope of this disclosure.

A problem with conventional conferencing systems is that it is often difficult or impossible for one person who has not joined a conference call to communicate with other people who have joined the conference call. For example, it may be difficult for a person who is running late for a conference call to convey that fact to others who have already joined the conference call. Moreover, some people who have already joined the conference call may not be using devices that are capable of receiving voice or electronic messages from the person running late.

In the illustrated example, the system 100 includes one or more communication devices 102a-102d, a network 104, and a media application server ("MAS") 106.

The communication devices 102a-102d represent devices used by users or subscribers during communication sessions. Communication sessions represent data conversions or conversations between devices or applications over a network. For example, each communication device 102a-102d represents an input/output device that could include a microphone and a speaker to capture and play audio information. A communication device 102a-102d could also include a camera and a display to capture and present video information. A communication device 102a-102d could further represent a portable computing device for sending and receiving text or other messages.

During a communication session, one or more of the devices 102 communicate with the MAS 106 over the network 104. As an example, a communication device 102 may transmit audio information to the MAS 106 and receive audio information from the MAS 106. Each communication device 102 may be constructed or configured from any suitable hardware, software, firmware, or combination thereof for transmitting or receiving audio, video, or other information.

The system 100 shown in FIG. 1 illustrates various embodiments of the communication devices 102. For example, the communication device 102a represents a wireless mobile station that communicates with the network 104 through a mobile switching center ("MSC") 108. The communication device 102b represents a wired Internet Protocol ("IP") telephone that communicates directly with the network 104. An example of a suitable device is an i2004 Internet Telephone, commercially available from Nortel Networks of Brampton, Ontario, Canada. The communication device 102c represents a personal computer, such as a desktop computer or a laptop computer. The communication device 102d represents a wireless device, such as a Blackberry or personal digital assistant. One or more of these devices 102a-102d may include video functionality, such as when the communication device 102a includes a video camera or when the communication device 102c is coupled to a web camera 110.

While this represents several embodiments of the communication devices 102, other or additional communication devices 102 may be utilized in the system 100 of FIG. 1. By way of illustration in FIG. 1, each of the communication devices 102a-102d is different. It will be understood, however, that the communication devices 102 in the system 100 may include or represent the same or similar type of device or other combination of communication devices.

The network 104 is coupled to the communication devices 102, the MAS 106, and the mobile switching center 108. In this document, the term "couple" refers to any direct or indirect communication between two or more components, whether or not those components are in physical contact with each other. The network 104 facilitates communication between components of the system 100. For example, the network 104 may communicate Internet Packets ("IP"), frame relay frames, Asynchronous Transfer Mode ("ATM") cells, Ethernet, X.25, frame relay, or other suitable information protocols between network addresses or devices. The network 104 may include one or more local area networks ("LANs"), metropolitan area networks ("MANs"), wide area networks ("WANs"), all or portions of a global network such as the Internet, or any other communication system or systems at one or more locations.

The media application server ("MAS") 106 is coupled to the network 104. The MAS 106 supports communication sessions between communication devices 102 in the system 100. For example, the MAS 106 may receive from one or multiple communication devices 102 requests to establish or join a conference call. The MAS 106 may also transmit/receive audio or video information to/from each communication device 102 involved in the conference call.

Figure 2:
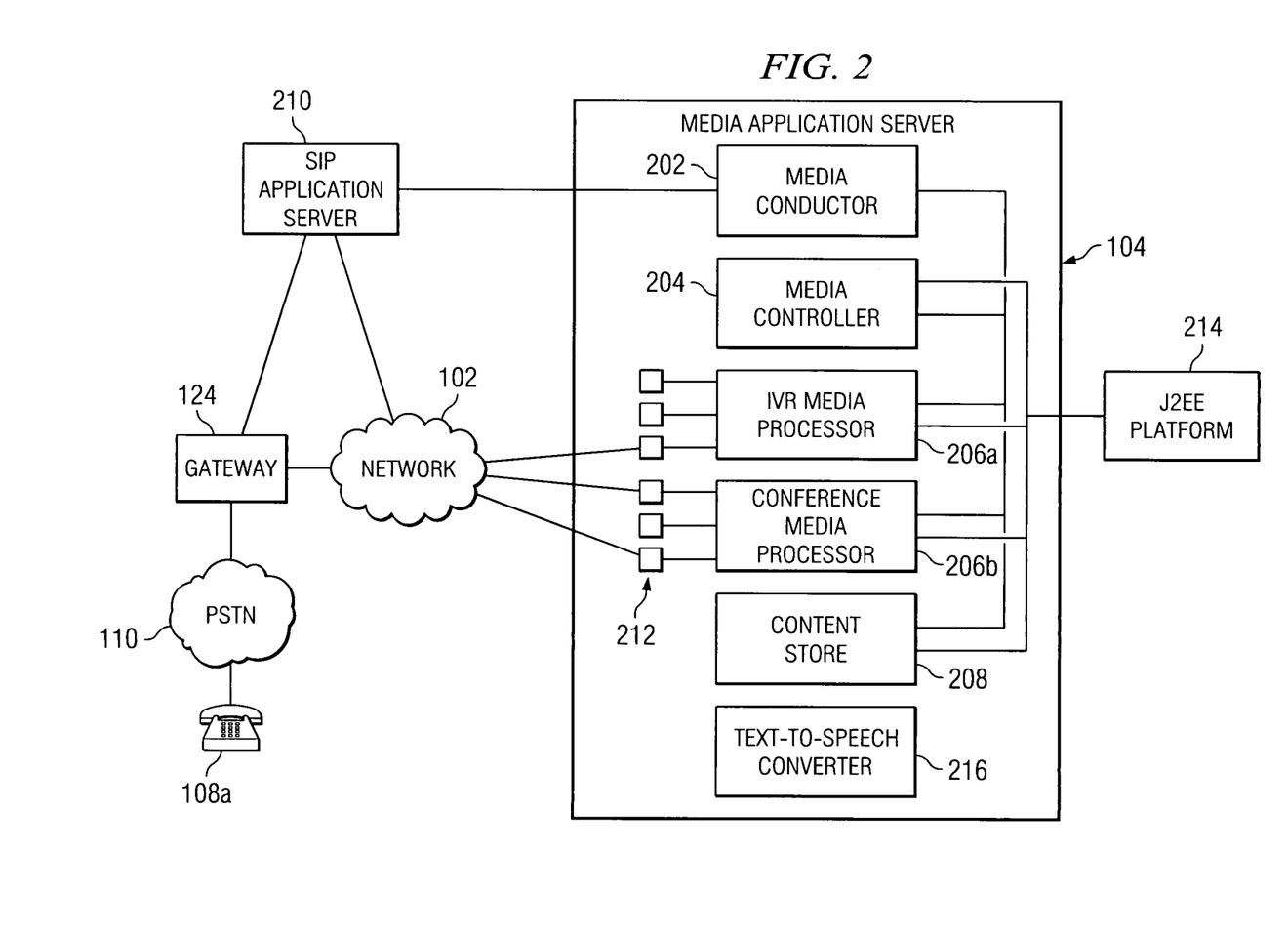
FIG. 2 illustrates an example media application server according to one embodiment of this disclosure.

The MAS 106 may be constructed or configured using hardware, software, firmware, or combination thereof for supporting communication sessions in the system 100. As an example, the MAS 106 could include one or more processors 112 that execute instructions and one or more memories 114 that store instructions and data used by the processors 112. The processor(s) 112 is generally understood to be a device that drives a general-purpose computer. It is noted, however, that other processor devices such as microcontrollers, Field Programmable Gate Arrays (FPGAs), or Application Specific Integrated Circuits (ASICs) can be used as well and achieve the benefits and advantages described herein. An example MAS 106 is shown in FIG. 2, which is described below and in co-pending U.S. patent application Ser. No. 10/610,511 entitled "DISTRIBUTED CALL SERVER SUPPORTING COMMUNICATION SESSIONS IN A COMMUNICATION SYSTEM AND METHOD," filed on Jun. 30, 2003, and which is incorporated by reference herein.

Communication session(s) established and managed by the MAS 106 can include additional communication devices other than the communication devices 102a-102d. For example, a communication device 102e is shown coupled to the network 104 through a public telephone network, such as a public switched telephone network ("PSTN") 116. The communication device 102e may include a conventional analog or digital telephone or some other type of communication device. In embodiments where the PSTN 116 and the network 104 use different or incompatible protocols to communicate, a gateway 118 may be used that is coupled to the network 104 and the PSTN 116 to facilitate communication between the networks. The gateway 118 functions to translate between the different protocols used by the network 104 and the PSTN 116. Although one PSTN 116 is shown in FIG. 1 coupled to the network 104, other or additional types of public or private networks may be coupled to the network 104.

The communication devices 102 and the MAS 106 are configured to support suitable standards or protocols used to set up, maintain, and terminate communication sessions between end users. As examples, the communication devices 102 and the MAS 106 may be operable to communicate audio, video, or other information using the Realtime Transfer Protocol ("RTP") over User Datagram Protocol ("UDP"), the International Telecommunication Union—Telecommunications ("ITU-T") H.263 standard (video CODEC), the G.711 and G.729 audio CODEC standards, and other or additional standards or protocols. Other CODECs, such as Moving Picture Experts Group-4 ("MPEG-4"), Digital Video Express ("DIVX"), and Windows Media Video ("WMV"), can be supported by the MAS 106. In addition, signaling messages sent between the communication devices 102 and the MAS 106 may include or conform with the Session Initiation Protocol ("SIP"), which is an application layer protocol for the establishment, modification, and termination of conferencing and telephony sessions over IP-based networks. As will be appreciated, other or additional protocols and configurations may be used.

In one aspect of operation, the MAS 106 includes one or more processes, such as software applications providing an activity, a function, or a systematic sequence of operations that produces a specified result, for handling conference calls, for receiving instant messages, and for performing text-to-speech conversion. In this document, the phrase "conference call" refers to a communication session that can (but need not) involve more than two participants. Also, the term "participant" refers to a person who joins a conference call, whether or not the person actually participates in the conference call (such as by speaking). A participant could represent a person who joins a conference call for the entirety of the call or for just a portion of the call. For a conference call, the MAS 106 supports a conference bridge that allows multiple participants to dial or otherwise contact the bridge and join a conference call. A "conference bridge" represents a facility or service that allows participants to be connected together for a conference call. In addition, the phrase "instant message" refers to a message that is transmitted from a source to a destination for presentation at the destination at the time it is received by the destination. An instant message may include any suitable contents, such as text, graphic symbols, audio contents, or any other contents.

During operation, the MAS 106 receives an instant message associated with a conference call. The instant message could, for example, represent a message sent from a participant who is running late for the conference call. As another example, the instant message could represent a message sent from a computing system having stock quotes or a location of a target being tracked. The target could represent a person, object, or any other entity capable of being tracked. The instant messages received by the MAS 106 could include any other or additional contents without departing from the scope of this disclosure.

After receiving an instant message, the MAS 106 identifies the conference bridge associated with the instant message. The MAS 106 converts at least some of the contents of the instant message into speech. The generated speech is then sent to one or more participants who have joined the conference bridge. In this way, information may is be provided to the participants who have joined the conference bridge. Moreover, the information may be easily provided to the participants without requiring those participants to have access to an instant message-capable device.

In addition to converting at least some of the contents of the instant message into speech, the MAS 106 may optionally provide additional speech. For example, the MAS 106 could generate speech identifying the name of the participant who sent the instant message. As a particular example, the MAS 106 could insert text into the instant message, such as the name of the participant who sent the message followed by "sent the following message." This text is then converted into speech and sent to the participants who have joined the conference bridge. The MAS 106 could also generate speech identifying the name of the participant followed by "sent the following message" independently of converting the instant message into speech (without inserting text into the instant message), and the MAS 106 then combines the speech. In this way, the participants hearing the generated speech know the source of the instant message. Any other or additional information could be inserted into the instant message or included as part of the generated speech, such as the date and time of the instant message and the location of the participant sending the message.

In addition to converting the instant message into speech and providing the speech to the participants who have joined the conference bridge, the MAS 106 could forward the instant message to one, some, or all of the participants. In this way, participants who have access to an instant message-capable device may be able to receive the instant messages received by the MAS 106. This may allow, for example, a participant responding to the instant message. As a particular example, after hearing an instant message converted into speech indicating that one participant is running late, another participant could respond with an instant message indicating that the conference call will be delayed for ten minutes.

In some embodiments, an instant message forwarded to a particular participant is sent to a specific communication device 102 associated with that participant. In other embodiments, an instant message forwarded to a particular participant is sent to some or all communication devices 102 associated with, that participant. In particular embodiments, such as when the SIP protocol is used in the system 100, a communication device 102 registers with the MAS 106 and is associated with a participant. When an instant message is to be forwarded to a participant, the instant message is sent to all registered communication devices 102 for that participant. By communicating the instant message to all registered communication devices 102 for a participant, the participant may be more likely to receive the instant message on at least one device.

As described above, when an instant message is received by the MAS 106, the MAS 106 identifies the conference bridge associated with the instant message. This may be accomplished in any suitable manner. For example, in some embodiments, a conference bridge may be is associated with a unique instant message user account, and any messages for that particular conference bridge are received through that user account. In this case, the MAS 106 detects an instant message arriving in a user account and identifies the conference bridge associated with that user account.

In other embodiments, the MAS 106 has a single instant message user account that receives instant messages for multiple conference bridges, and the MAS 106 identifies a particular conference bridge using information included in the instant message. For example, an instant message could include a hidden instant message parameter identifying the conference bridge. As a particular example, the hidden instant message parameter could take the form "SIP SIMPLE tag=XYZ identifyxxxxx", where the XYZ parameter represents the participant sending the message and the identifyxxxxx parameter identifies the conference bridge. While this represents one example of a parameter that can be used, other or additional parameters could be used in the instant message. As another example, an instant message could include an instant message source account name identifying the conference bridge. In addition, an instant message could include explicit text identifying the conference bridge.

In yet another embodiment, the MAS 106 sends instant messages to one or more participants or future participants identifying various events that occur during a conference call. For example, when a new participant joins a conference bridge, the MAS 106 may send an instant message to one or more current participants or future participants identifying the new participant. This mechanism is described in U.S. patent application Ser. No. 10/675,121 entitled "APPARATUS, METHOD, AND COMPUTER PROGRAM FOR PROVIDING INSTANT MESSAGES RELATED TO A CONFERENCE CALL." In these embodiments, in accordance with this disclosure, when a current participant or future participant receives an instant message from the MAS 106, that participant may respond to the instant message with another instant message. The MAS 106 receives the other instant message, converts the message to speech, and conveys the speech to the participants who have already joined the conference call. As a particular example, a future participant who is running late for a conference call may receive instant messages indicating that several participants have already joined the conference bridge. The participant who is running late may respond to one of the instant messages with another instant message indicating that the participant will be late for the call.

This has described several examples of the instant messages that may be communicated to one or more participants in a conference call and the various ways that instant messages can be sent and associated with a conference bridge. Instant messages including other or additional contents could be sent at any suitable time to any or all of the participants without departing from the scope of this disclosure. Also, additional information may be added to the instant messages and/or provided as speech to one or more participants. Further, the instant messages can be sent and associated with a conference bridge in any other suitable manner. In addition, while the MAS 106 may convert any suitable contents in the instant message into speech, the MAS 106 may not need to convert other contents into speech. As a particular example, if the instant message contains audio information, the MAS 106 may provide the audio information without needing to convert the audio information into speech. As another particular example, if the instant message contains an image that cannot be converted into speech, the MAS 106 may provide speech indicating that the instant message contains unconvertible material.

Although FIG. 1 illustrates one example of a communication system 100, various changes may be made to FIG. 1. For example, any number of communication devices 102, networks 104, and servers 106 could be used in the system 100. Also, the functionality of MAS 106, described above as being implemented on a server, could be implemented on another computing device or devices, such as a desktop computer or a laptop computer. In addition, FIG. 1 illustrates one operational environment in which the various features of the MAS 106 may be used. These features could be implemented in any other suitable operating environment.

FIG. 2 illustrates an example media application server 106 according to one embodiment of this disclosure. The MAS 106 illustrated in FIG. 2 is for illustration only. Other embodiments of the MAS 106 could be used without departing from the scope of this disclosure. Also, while FIG. 2 illustrates the MAS 106 operating in the system 100 of FIG. 1, the MAS 106 may operate in other suitable systems.

In the illustrated example, the MAS 106 includes a media conductor 202, a media controller 204, two media processors ("MPs") 206a-206b, and a content store 208.

The media conductor 202 processes signaling messages received by the MAS 106. In some embodiments, the communication devices 102 communicate the signaling messages directly (or via a gateway, which serves as an entrance/exit into a communications network) to the MAS 106. In other embodiments, the communication devices 102 communicate signaling messages indirectly to the MAS 106, such as when a Session Initiation Protocol ("SIP") application server 210 (that received a request from a communication device 102) sends the signaling messages to the media conductor 202 on behalf of the communication device 102. The communication devices 102 may communicate directly with the SIP application server 210 or indirectly through a gateway, such as gateway 118. The media conductor 202 processes the signaling messages and communicates the processed messages to the media controller 204. As particular examples, the media conductor 202 may implement SIP call control, parameter encoding, and media event package functionality.

The media controller 204 manages the operation of the MAS 106 to provide services to the communication devices 102. For example, the media controller 204 may receive processed SIP requests from the media conductor 202, where the requests involve conference or other calls. The controller 204 may then select the media processor 206 to handle each of the calls, support audio/video capability negotiations, enforce licenses controlling how the MAS 106 can be used, and control negotiations based on the licenses. The negotiations could include identifying the CODEC or CODECs to be used to encode and decode audio or video information during a call.

The media processors 206a-206b handle the exchange of audio or video information between communication devices 102 involved in a conference or other call. For example, a media processor 206 could receive audio and video information from one communication device 102 involved in a call, process the information as needed, and forward the information to at least one other communication device 102 involved in the call. The audio and video information may be received through one or more ports 212, which couple the media processors 206 to the network 104. The ports 212 may represent any suitable structure operable to facilitate communication between the MAS 106 and the network 104. In some embodiments, each of the media processors 206 represents a software application for specific media processing, such as interactive voice response ("IVR") media or conference media, which is executed on the MAS 106 hardware platform via the operating system.

In this example embodiment, each media processor 206 provides different functionality in the MAS 106. For example, in some embodiments, the media processor 206a provides IVR functionality in the MAS 106. As particular examples, the media processor 206a supports a voice mail function that can record and play messages or an auto-attendant function that provides a menu and directs callers to particular destinations based on their selections. The media processor 206b provides conferencing functionality in the MAS 106, such as by facilitating the exchange of audio and video information between communication devices 102.

The content store 208 provides access to content used by the various components of the system 100. For example, in some embodiments, the content store 208 provides access to stored voice mail messages and access codes used to initiate or join conference calls. The content store 208 may also provide access to custom emoticons provided by participants in the system 100. The content store 208 further provides access to any other or additional information. In other embodiments, the content store 208 is replaced by a conventional database or other data storage facility.

A Java 2 Enterprise Edition ("J2EE") platform 214 is coupled to the MAS 106. The J2EE platform 214 allows the MAS 106 to retrieve information used to provide subscriber services in the system 100. For example, the J2EE platform 214 may provide audio announcements used by the IVR media processor 206a. The J2EE platform 214 may also provide standard or default emoticons that are available for use during communication sessions. The J2EE platform 214 represents one possible apparatus used to provide audio or other information to the MAS 106. Any other or additional device or apparatus may be used to provide the information to the MAS 106.

In addition, the MAS 106 includes a text-to-speech converter 216. The text-to-speech converter 216 receives text data and generates speech data based on the text data. In particular, the text-to-speech converter 216 converts the contents of an instant message from text to speech by generating an audio stream based on the contents of the message. The text-to-speech converter 216 may receive the contents of the instant message in any suitable manner. For example, in some embodiments, the media controller 204 receives an instant message through the media conductor 202, and the media controller 204 extracts and forwards the contents of the instant message to the conference media processor 206b and/or the text-to-speech converter 216. The text-to-speech converter 216 represents any suitable hardware, software, firmware, or combination thereof for converting text to speech.

In a particular embodiment, various components of the MAS 106 represent software processes executed by the processor 112 of the MAS 106. While the components have been described as being executed by a MAS 106, the software processes could be executed by other computing devices such as a desktop computer. In other embodiments, the various components of the MAS 106 may be implemented in other ways, such as in hardware.

In the illustrated example, the conference media processor 206b implements the conferencing functionality described above. For example, the media conductor 202 receives signaling messages indicating that two or more communication devices 102 wish to engage in a conference call. The controller 204 receives the requests and causes the conference media processor 206b to establish the conference call over a conference bridge. The conference is media processor 206b then receives audio or video information from each communication device 102 and forwards the information to the other communication devices 102.

In some embodiments, during a conference call, the MAS 106 receives an instant message to be delivered to the participants who have joined the conference call. The media conductor 202 receives the instant message and forwards the message to the media controller 204, which then forwards at least the contents of the message to the conference media processor 206b. The conference media processor 206b identifies the conference bridge associated with the instant message and sends the contents of the message to the text-to-speech converter 216. The text-to-speech converter 216 generates an audio stream using the contents of the instant message. The conference media processor 206b then provides the audio stream to one, some, or all of the participants who have joined the conference call.

Before sending the audio stream to the participants, the conference media processor 206b and/or the text-to-speech converter 216 encodes the audio stream using one or more CODECs. The number of CODECs used may depend, for example, on whether the participants who will receive the audio stream are using a common CODEC or different CODECs. In particular embodiments, the conference media processor 206b encodes the audio stream once for each CODEC being used by the participants.

The MAS 106 may further forward the contents of the original instant message to the participants who have already joined the conference call. For example, the media controller 204 may generate a new instant message for each of the participants who have already joined the conference call, where the contents of the new message include the contents of the original instant message received and converted into speech. The new instant messages are then converted into SIP format by the media conductor 202, which communicates the new instant messages to one or more communication devices 102. The new instant messages may be sent directly to the communication devices 102 by the media conductor 202 or indirectly through the SIP application server 210.

Although FIG. 2 illustrates one example of a media application server 106, various changes may be made to FIG. 2. For example, any number of media processors 206 could be used in the MAS 106. Also, the functional divisions shown in FIG. 2 are for illustration only. Various components can be combined or omitted or additional components can be added according to particular functional designations or needs. In addition, while the components 202-208 have been described as being executed by a server, the components 202-208 may be executed by other hardware platforms, such as a desktop computer or a laptop computer.

Figure 3:
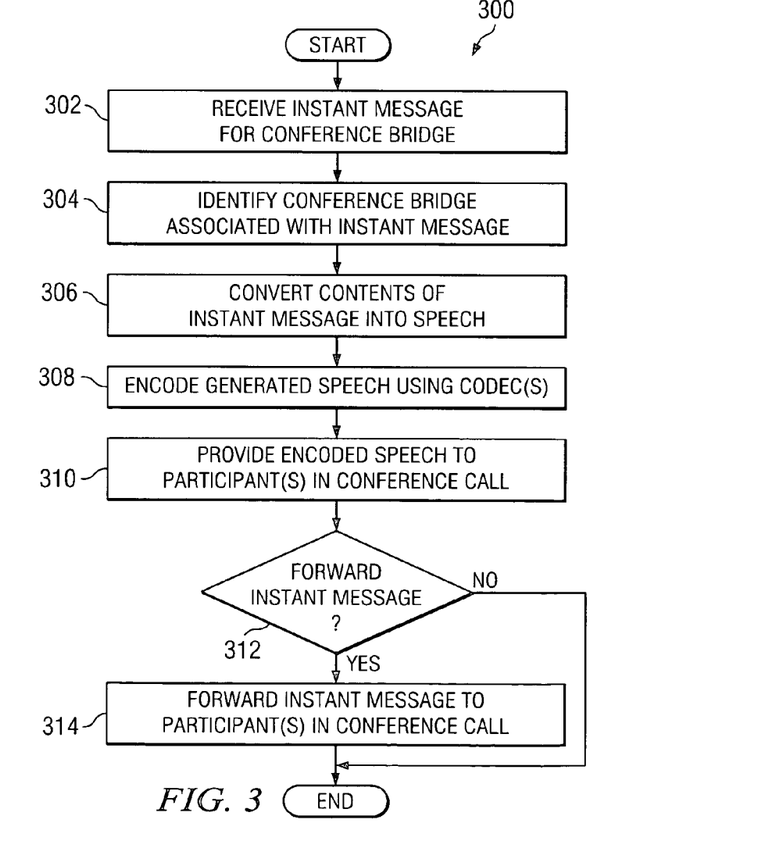
FIG. 3 illustrates an example method for performing text-to-speech conversion of instant messages during a conference call according to one embodiment of this disclosure.

FIG. 3 illustrates an example method 300 for performing text-to-speech conversion of instant messages during a conference call according to one embodiment of this disclosure. For ease of illustration and explanation, the method 300 is described with respect to the MAS 106 of FIG. 2 operating in the system 100 of FIG. 1. The method 300 could be used by any other suitable apparatus or device and in any other suitable system.

The MAS 106 receives an instant message associated with a conference call at step 302. Receipt of the instant message may include, for example, the media conductor 202 receiving the instant message and forwarding at least the contents of the instant message to the media controller 204. The media conductor 202 may receive the instant message directly from a communication device 102 or indirectly through the SIP application server 210. Receipt may also include the media controller 204 forwarding at least the contents of the instant message to the conference media processor 206b.

The MAS 106 identifies a conference bridge associated with the instant message at step 304. Identification of the conference bridge may include, for example, the media controller 204 or the conference media processor 206b identifying the conference bridge using a user account associated with a specific conference bridge or a hidden instant message parameter, source account name, or text included in the instant message. Identification of the conference bridge may also include the media controller 204 or the conference media processor 206b determining that the received instant message was sent in response to a prior instant message, where the prior instant message was associated with a particular conference bridge.

The MAS 106 converts the contents of the instant message into speech at step 306. Conversion may include, for example, the conference media processor 206b transferring the instant message or the contents of the instant message to the text-to-speech converter 216, the text-to-speech converter 216 generating an audio stream based on the contents of the instant message, and the text-to-speech converter 216 providing the audio stream to the conference media processor 206b. Conversion into speech may also include the conference media processor 206b causing additional speech to be generated or otherwise received in addition to the speech associated with the contents of the instant message. For example, the conference media processor 206b may add additional text to the contents of the instant message before conversion. As another example, the conference media processor 206b may supply additional text to the text-to-speech converter 216 separate from the contents of the instant message and receive two separate audio streams that are then combined. As yet another example, the conference media processor 206b may retrieve stored speech to be combined with the speech generated by the text-to-speech converter 216.

The MAS 106 encodes the generated speech using one or more CODECs at step 308. Encoding may include, for example, the conference media processor 206b identifying at least one audio CODEC being used by the participant(s) who have joined the conference bridge. Encoding may also include the conference media processor 206b encoding the audio stream using the identified CODEC or CODECs.

The MAS 106 provides the encoded speech to one or more of the participants who have joined the conference bridge at step 310. This may include, for example, the conference media processor 206b providing the encoded audio stream to one or more communication devices 102 associated with each participant.

The MAS 106 determines whether the original instant message should be forwarded to one or more of the participants at step 312. This determination may include, for example, the MAS 106 using the contents of the original instant message received at step 302 to determine whether to forward the message. This determination may also include the MAS 106 using a default or customized setting indicating whether the original instant message should be forwarded.

If the original instant message should not be forwarded, the MAS 106 allows the conference call to continue until conclusion, which may include a repeat of the method 300. Otherwise, if the original instant message may be forwarded, the MAS 106 forwards the original instant message to one or more of the participants who have joined the conference bridge at step 314. This step may include, for example, the conference media processor 206b forwarding the original instant message or new instant message(s) including the contents of the original message to the participant(s) through the media controller 204 and the media conductor 202.

Although FIG. 3 illustrates one example of a method 300 for performing text-to-speech conversion of instant messages during a conference call, various changes may be made to FIG. 3. For example, the instant message could always be forwarded to the participants in a conference call, and the MAS 106 could skip decisional step 312. Also, the MAS 106 need not encode the generated speech.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
conducting, by a call server, a conference call using a conference bridge;
during the conference call, receiving, at the call server, an instant message from a device of a first participant invited to the conference call, wherein during said receiving, the device has not joined the conference call;
converting at least some contents of the instant message into an audio stream; and
providing the audio stream to at least one other participant that has already joined the conference call.

2. The method of claim 1, further comprising identifying the conference call associated with the instant message.

3. The method of claim 2, wherein identifying the conference call associated with the instant message comprises at least one of:
identifying a user account that received the instant message, the user account uniquely associated with the conference bridge that supports the conference call;
identifying the conference bridge that supports the conference call using at least one of a hidden instant message parameter, an instant message source account name, and explicit text in the instant message; and
determining whether the instant message was sent in response to a second instant message, the second instant message associated with the conference call.

4. The method of claim 1, further comprising:
encoding the audio stream using at least one CODEC; and
wherein providing the audio stream to the at least one other participant comprises providing the encoded audio stream to the at least one participant.

5. The method of claim 1, further comprising forwarding at least some of the contents of the instant message to the at least one other participant.

6. The method of claim 1, wherein converting at least some of the contents of the instant message into the audio stream comprises converting text in the instant message into speech.

7. The method of claim 6, wherein the audio stream comprises the generated speech and additional speech.

8. The method of claim 7, wherein the additional speech identifies a person who sent the instant message.

9. An apparatus, comprising:
one or more ports operable to receive at least one channel associated with a conference call, the at least one channel associated with at least two conference call participants; and
one or more processors collectively operable to:
conduct the conference call using a conference bridge;
during the conference call, receive an instant message from a device of a first participant invited to the conference call, wherein during said receiving, the device has not joined the conference call;
generate an audio stream based on at least some contents of the instant message; and
provide the audio stream to at least one of the at least two conference call participants that have already joined the conference call.

10. The apparatus of claim 9, wherein the one or more processors are further collectively operable to identify the conference call associated with the instant message by at least one of:
identifying a user account that received the instant message, the user account uniquely associated with the conference bridge that supports the conference call;
identifying the conference bridge that supports the conference call using at least one of a hidden instant message parameter, an instant message source account name, and explicit text in the instant message; and
determining whether the instant message was sent in response to a second instant message, the second instant message associated with the conference call.

11. The apparatus of claim 9, wherein the one or more processors are further collectively operable to encode the audio stream using at least one CODEC; and
wherein providing the audio stream comprises providing the encoded audio stream to at least one of the at least two conference call participants.

12. The apparatus of claim 9, wherein the one or more processors are further collectively operable to forward at least some of the contents of the instant message to the at least one participant.

13. The apparatus of claim 9, wherein the audio stream comprises generated speech associated with text in the instant message and additional speech, the additional speech identifying a person who sent the instant message.

14. The apparatus of claim 9, wherein the one or more processors are operable to execute a plurality of software processes, the software processes comprising:
a media conductor operable to receive signaling messages, at least some of which are related to the conference call;
a media controller operable to manage operation of the apparatus; and
a plurality of media processors operable to support communication sessions, at least one of the media processors comprising a conference media processor operable to support the conference call.

15. A non-transitory computer readable medium having a computer program operable to be executed by a processor, the computer program comprising computer readable program code for:
conducting a conference call using a conference bridge;
during the conference call, receiving an instant message from a device of a first participant invited to the conference call, wherein during said receiving, the device has not joined the conference call;
generating an audio stream based on at least some contents of the instant message; and
providing the audio stream to at least one other participant that has already joined the conference call.

16. The non-transitory computer readable medium of claim 15, wherein the computer program further comprises computer readable program code for identifying the conference call associated with the instant message by at least one of:
identifying a user account that received the instant message, the user account uniquely associated with the conference bridge that supports the conference call;
identifying the conference bridge that supports the conference call using at least one of a hidden instant message parameter, an instant message source account name, and explicit text in the instant message; and
determining whether the instant message was sent in response to a second instant message, the second instant message associated with the conference call.

17. The non-transitory computer readable medium of claim 15, wherein the computer program further comprises computer readable program code for encoding the audio stream using at least one CODEC; and
   wherein the computer readable program code for providing the audio stream comprises computer readable program code for providing the encoded audio stream to the at least one other participant.

18. The non-transitory computer readable medium of claim 15, wherein the computer program further comprises computer readable program code for forwarding at least some of the contents of the instant message to the at least one other participant.

19. The non-transitory computer readable medium of claim 15, wherein the computer readable program code for generating the audio stream comprises computer readable program code for converting text in the instant message into speech.

20. The non-transitory computer readable medium of claim 19, wherein the audio stream comprises the generated speech and additional speech, the additional speech identifying a person who sent the instant message.

* * * * *